(12) United States Patent
Yang et al.

(10) Patent No.: US 9,369,242 B2
(45) Date of Patent: Jun. 14, 2016

(54) DISCARDING OF HYBRID AUTOMATIC REPEAT REQUEST (HARQ) PROCESSES

(71) Applicant: QUALCOMM Incorporated, San Diego, CA (US)

(72) Inventors: Ming Yang, San Diego, CA (US); Tom Chin, San Diego, CA (US); Guangming Shi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 96 days.

(21) Appl. No.: 14/139,741

(22) Filed: Dec. 23, 2013

(65) Prior Publication Data

US 2015/0180613 A1 Jun. 25, 2015

(51) Int. Cl.
*H04L 1/16* (2006.01)
*H04L 1/18* (2006.01)

(52) U.S. Cl.
CPC ............ *H04L 1/1822* (2013.01); *H04L 1/1874* (2013.01); *H04L 1/1887* (2013.01); *H04L 1/1896* (2013.01)

(58) Field of Classification Search
None
See application file for complete search history.

(56) References Cited

U.S. PATENT DOCUMENTS

| 8,296,617 | B2 | 10/2012 | Balachandran et al. | |
|---|---|---|---|---|
| 8,300,573 | B2 | 10/2012 | Lindskog et al. | |
| 2007/0002801 | A1* | 1/2007 | Usuda et al. | 370/333 |
| 2008/0215948 | A1* | 9/2008 | Pinheiro | H04L 1/1887 |
| | | | | 714/748 |
| 2009/0199061 | A1* | 8/2009 | Lee | H04L 1/1812 |
| | | | | 714/748 |
| 2010/0034113 | A1* | 2/2010 | Marinier | H04L 47/10 |
| | | | | 370/252 |
| 2010/0142494 | A1 | 6/2010 | Hsu | |
| 2010/0238829 | A1* | 9/2010 | Sambhwani et al. | 370/252 |
| 2011/0134829 | A1* | 6/2011 | Chen et al. | 370/328 |
| 2015/0172023 | A1* | 6/2015 | Yang | H04L 1/1672 |
| | | | | 370/329 |

FOREIGN PATENT DOCUMENTS

CN 102111251 A 6/2011

OTHER PUBLICATIONS

International Search Report and Written Opinion—PCT/US2014/072271—ISA/EPO—Apr. 7, 2015.
TD Tech: "Clarification of RX-Timer Reset in 25.321 (R7) for 1.28Mcps TDD", 3GPP Draft, R2-086872 Clarification of RX-Timer Reset in 25.321(R8) for 1.28MCPS TDD, 3rd Generation Partnership Project (3GPP), Mobile Competence Centre, 650, Route Des Lucioles, F-06921 Sophia-Antipolis Cedex, France, no. Prague, Czech Republic, Nov. 14, 2008, XP050321654.
TD Tech: "MC-HSUPA Related HARQ Operation in UE for LCR TDD", 3GPP Draft, R2-114980, 3rd Generation Partnership Project (3GPP), Mobile Competence Centre, 650, Route Des Lucioles, F-06921, Sophia-Antipolis Cedex, France, vol. RAN WG2, no. Zhuhai, 20111010, Sep. 30, 2011, XP050540562.

* cited by examiner

*Primary Examiner* — Kevin C Harper
*Assistant Examiner* — Derrick V Rose
(74) *Attorney, Agent, or Firm* — Seyfarth Shaw LLP

(57) ABSTRACT

A method of wireless communication includes receiving an uplink grant for one or more pending HARQ processes waiting to perform a retransmission. The method also includes selecting each pending HARQ process that has not received a NACK. The method further includes terminating an oldest selected HARQ process when the uplink grant is insufficient to perform the retransmission for the plurality of pending HARQ processes.

20 Claims, 7 Drawing Sheets

DISCARDING OF HYBRID AUTOMATIC REPEAT REQUEST (HARQ) PROCESSES

BACKGROUND

1. Field

Aspects of the present disclosure relate generally to wireless communication systems, and more particularly, to improving a hybrid automatic repeat request (HARQ) processing.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, high speed downlink packet access (HSDPA) and high speed uplink packet access (HSUPA), which extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes receiving an uplink grant for one or more pending HARQ processes waiting to perform a retransmission. The method also includes selecting each pending HARQ process that has not received a NACK. The method further includes terminating an oldest selected HARQ process when the uplink grant is insufficient to perform the retransmission for the plurality of pending HARQ processes.

Another aspect discloses an apparatus including means for receiving an uplink grant for one or more pending HARQ processes waiting to perform a retransmission. The apparatus also includes means for selecting each pending HARQ process that has not received a NACK. The apparatus further includes means for terminating an oldest selected HARQ process when the uplink grant is insufficient to perform the retransmission for the plurality of pending HARQ processes.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving an uplink grant for one or more pending HARQ processes waiting to perform a retransmission. The program code also causes the processor(s) to select each pending HARQ process that has not received a NACK. The program code further causes the processor(s) to terminate an oldest selected HARQ process when the uplink grant is insufficient to perform the retransmission for the plurality of pending HARQ processes.

Another aspect discloses wireless communication having a memory and at least one processor coupled to the memory. The processor(s) is configured to receive an uplink grant for one or more pending HARQ processes waiting to perform a retransmission. The processor(s) is also configured to select each pending HARQ process that has not received a NACK. The processor(s) is further configured to terminate an oldest selected HARQ process when the uplink grant is insufficient to perform the retransmission for the plurality of pending HARQ processes.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
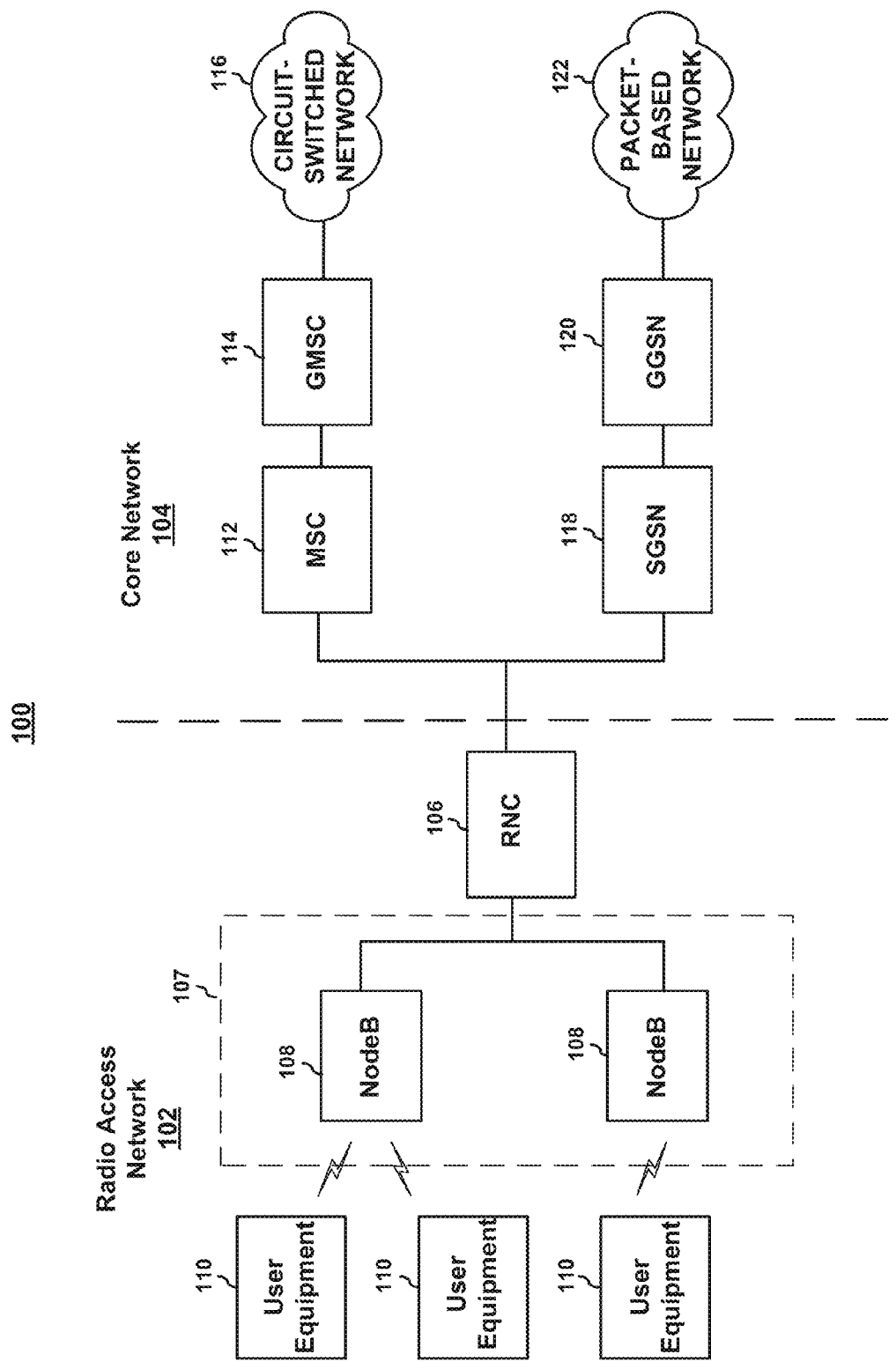
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of radio network subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. General packet radio service (GPRS) is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum direct-sequence code division multiple access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
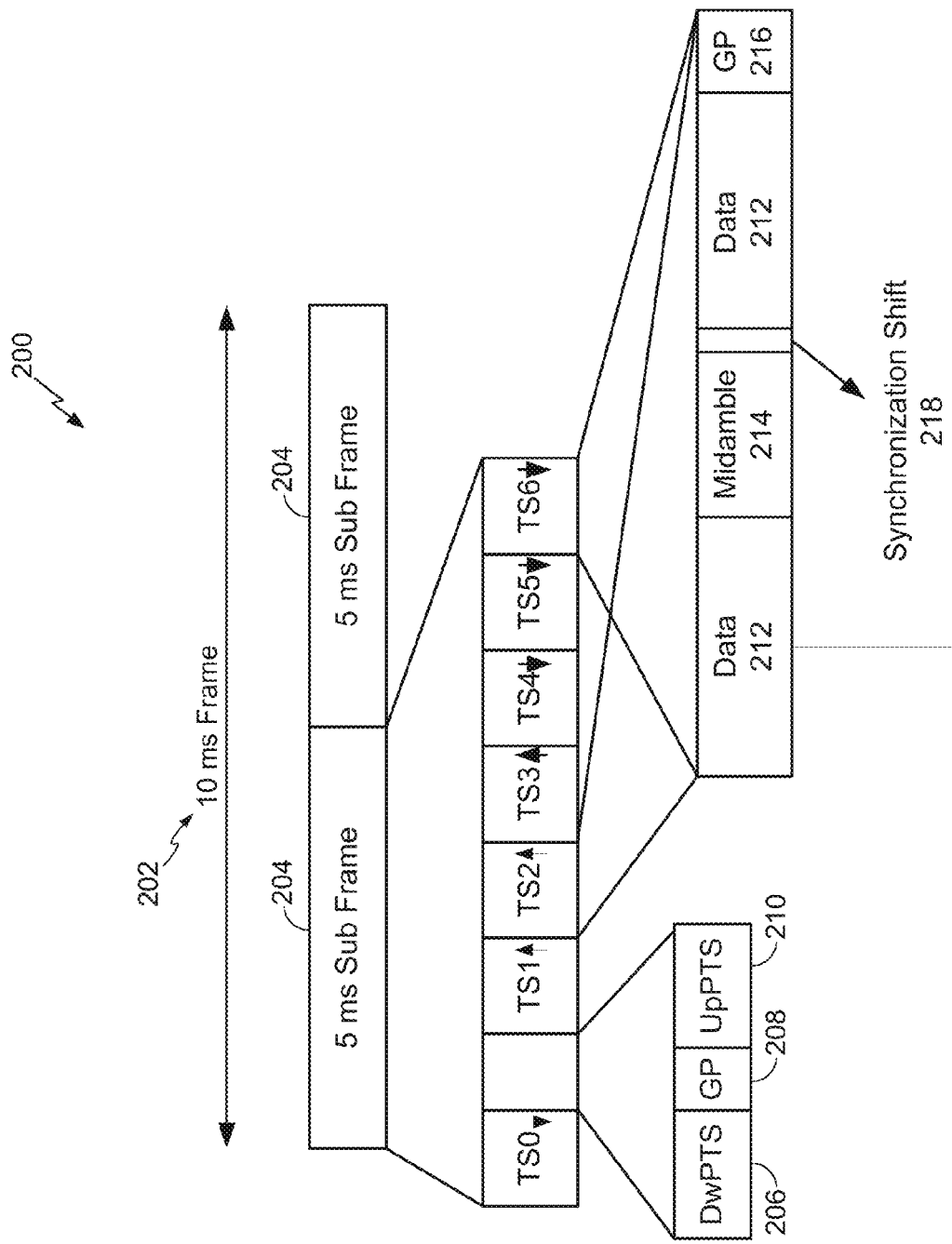
FIG. 2 is a block diagram conceptually illustrating an example of a frame structure in a telecommunications system.

FIG. 2 shows a frame structure 200 for a TD-SCDMA carrier. The TD-SCDMA carrier 200, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. SS bits 218 only appear in the second part of the data portion. The SS bits 218 immediately following the midamble can indicate three cases: decrease shift, increase shift, or do nothing in the upload transmit timing. The positions of the SS bits 218 are not generally used during uplink communications.

Figure 3:
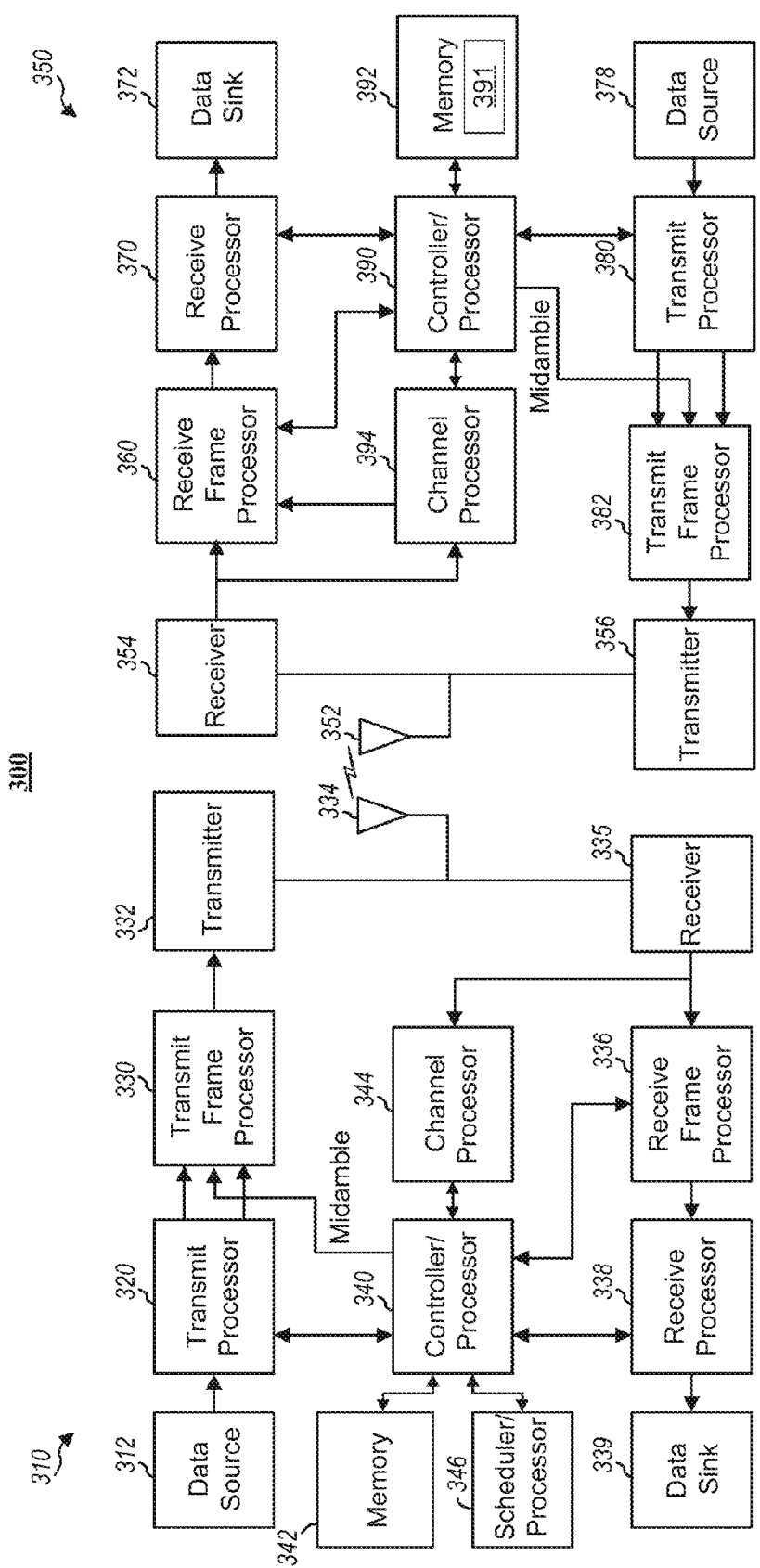
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the node B 310 and the UE 350, respectively. For example, the memory 392 of the UE 350 may store the HARQ terminating module 391 which, when executed by the controller/processor 390, configures the UE 350 for terminating HARQ processes based on pre-determined priority. In one configuration, the HARQ processes that have not received an ACK/NACK are terminated prior to terminating HARQ processes that are waiting for a retransmission. A scheduler/processor 346 at the node B 310 may be used to allocate resources to the UEs and schedule downlink and/or uplink transmissions for the UEs.

High speed uplink packet access (HSUPA) or time division high speed uplink packet access (TD-HSUPA) is a set of enhancements to time division synchronous code division multiple access (TD-SCDMA) in order to improve uplink throughput. In TD-HSUPA, the following physical channels are relevant.

The enhanced uplink dedicated channel (E-DCH) is a dedicated transport channel that features enhancements to an existing dedicated transport channel carrying data traffic. Additionally, the enhanced data channel (E-DCH) or enhanced physical uplink channel (E-PUCH) carries E-DCH traffic and schedule information (SI). Information in this E-PUCH channel can be transmitted in a burst fashion. Furthermore, the E-DCH uplink control channel (E-UCCH) carries layer 1 (or physical layer) information for E-DCH transmissions. The transport block size may be 6 bits and the retransmission sequence number (RSN) may be 2 bits. Also, the hybrid automatic repeat request (HARQ) process ID may be 2 bits.

Moreover, the E-DCH random access uplink control channel (E-RUCCH) is an uplink physical control channel that carries SI and enhanced radio network temporary identities (E-RNTI) for identifying UEs. The absolute grant channel for E-DCH (enhanced access grant channel (E-AGCH)) carries grants for E-PUCH transmission, such as the maximum allowable E-PUCH transmission power, time slots, and code channels. Finally, the hybrid automatic repeat request (hybrid ARQ or HARQ) indication channel for E-DCH (E-HICH) carries HARQ ACK/NACK signals.

The operation of TD-HSUPA may also have the following steps. First, the UE sends requests (e.g., via scheduling information (SI)) via the E-PUCH or the E-RUCCH to a base station (e.g., NodeB). The requests are for permission to transmit on the uplink channels. Second, the base station, which controls the uplink radio resources, allocates resources. Resources are allocated in terms of scheduling grants (SGs) to individual UEs based on their requests. Third, the UE transmits on the uplink channels after receiving grants from the base station. The UE determines the transmission rate and the corresponding transport format combination (TFC) based on the received grants. The UE may also request additional grants if it has more data to transmit. Fourth, a hybrid automatic repeat request (hybrid ARQ or HARQ) process is employed for the rapid retransmission of erroneously received data packets between the UE and the base station.

The transmission of scheduling information (SI) may consist of two types in TD-HSUPA: (1) In-band and (2) Out-band. For in-band, which may be included in medium access control e-type protocol data unit (MAC-e PDU) on the E-PUCH, data can be sent standalone or may piggyback on a data packet. For Out-band, data may be sent on the E-RUCCH in case that the UE does not have a grant. Otherwise, the grant expires.

Scheduling information (SI) includes the following information or fields. The highest priority logical channel ID (HLID) field unambiguously identifies the highest priority logical channel with available data. If multiple logical channels exist with the highest priority, the one corresponding to the highest buffer occupancy will be reported. Additionally, the total E-DCH buffer status (TEBS) field identifies the total amount of data available across all logical channels for which reporting has been requested by the radio resource control (RRC) and indicates the amount of data in number of bytes that is available for transmission and retransmission in the radio link control (RLC) layer. When the medium access control (MAC) is connected to an acknowledged mode (AM) RLC entity, control protocol data units (PDUs) to be transmitted and RLC PDUs outside the RLC transmission window are also be included in the TEBS. RLC PDUs that have been transmitted but not negatively acknowledged by the peer entity shall not be included in the TEBS. The actual value of TEBS transmitted is one of 31 values that are mapped to a range of number of bytes (e.g., 5 mapping to TEBS, where 24<TEBS<32).

Moreover, the highest priority logical channel buffer status (HLBS) field indicates the amount of data available from the logical channel identified by HLID, relative to the highest value of the buffer size reported by TEBS. In one configuration, this report is made when the reported TEBS index is not 31, and relative to 50,000 bytes when the reported TEBS index is 31. The values taken by HLBS are one of a set of 16 values that map to a range of percentage values (e.g., 2 maps to 6%<HLBS<8%). Furthermore, the UE power headroom (UPH) field indicates the ratio of the maximum UE transmission power and the corresponding dedicated physical control channel (DPCCH) code power. Finally, the serving neighbor path loss (SNPL) reports the path loss ratio between the serving cells and the neighboring cells. The base station scheduler incorporates the SNPL for inter-cell interference management tasks to avoid neighbor cell overload.

Discarding HARQ Processes

In a typical system, such as TD-HSUPA, one hybrid automatic repeat request (HARQ) entity is specified for a UE. A number of parallel HARQ processes identified by a HARQ process identifier may be used to support the HARQ entity. For example, parallel HARQ processes may be used by the UE for continuous transmissions while the UE is granted resources. That is, a HARQ process is used for a transmission in response to receiving the grant.

Specifically, the HARQ entity identifies a HARQ process that may be transmitted when resources are available via a grant. Additionally, based on a timing of a previously-transmitted MAC-e protocol data unit (PDU), the HARQ entity routes the receiver feedback (ACK/NACK information), relayed by the physical layer, to the appropriate HARQ process.

The HARQ entity may determine a specific HARQ process that may use the resources assigned in a grant for a given transmission time interval (TTI). The HARQ entity may also determine whether new data or existing data should be transmitted from the HARQ process buffer for each HARQ process.

In a typical system, when a UE receives a grant, the HARQ entity determines whether the HARQ process buffers are empty. When the buffers of all of the HARQ processes are empty, the HARQ entity notifies the transport format combination for E-DCH (E-TFC) selection entity that the next transmission time interval is available for a new transmission.

In one configuration, when the transport format combination for E-DCH selection entity indicates that a new E-DCH data transmission is specified, the UE selects a HARQ ID; obtains the transmission information from the transport format combination for E-DCH selection entity; and instructs the selected HARQ process to trigger new transmission. Alternatively, when the transport format combination for E-DCH selection entity does not indicate the need for a new E-DCH data transmission, the UE selects a HARQ ID and instructs the selected HARQ process to trigger the transmission of scheduling information.

In another configuration, when the buffers of all of HARQ processes are not empty, for example, when retransmissions are pending for any of the HARQ processes, the HARQ entity determines, for each HARQ process, whether the current resource grant is sufficient to allow retransmission of the data. In the present configuration, the grant is sufficient when a determined transport block size is supported by the time slot(s) specified in the grant. The transport block size may be determined based on the transmission power specified in the grant. Moreover, in the present configuration, when the grant is sufficient for retransmission of one of the HARQ processes, the HARQ process including the oldest MAC-e may be selected for retransmission.

Alternatively, in the present configuration, when the grant is not sufficient for retransmission by the HARQ processes, the HARQ entity selects an available HARQ process for a new transmission. Still, when a HARQ process is not available for a new transmission, such as when all of the HARQ processes include data for a retransmission, the HARQ entity discards the data from the HARQ process including the oldest MAC-e and selects the HARQ process with the discarded data for a new transmission.

In a typical system, when a UE receives a grant, the UE is specified to use the grant to transmit a HARQ process. As previously discussed, when all of the HARQ processes are waiting for grants to perform a retransmission, and a transport block size of a grant is not sufficient for retransmission by any of the available HARQ processes, the HARQ entity selects an available HARQ process for a new transmission. The UE discards a HARQ process with the oldest PDU to free the oldest HARQ process for use for the new transmission.

In some cases, the HARQ process may have received a NACK from the base station and is waiting for the grant to perform a retransmission. In other cases, the HARQ process may be waiting for an ACK/NACK from the base station. Specifically, when the UE transmits a PDU, such as an E-PUCH PDU, the UE waits to receive the ACK/NACK. In one configuration, the UE waits for a number of slots $n_{E\text{-}HICH}$ to receive the ACK/NACK. The ACK/NACK may be transmitted on an enhanced HARQ indication channel, such as the E-HICH. The minimum number of time slots to wait may be configured by the network. In a typical system, the range is set to from four to fifteen timeslots. Still, aspects of the present disclosure are not limited to the range of four to fifteen timeslots.

In some cases, when the UE discards the HARQ process waiting for the ACK/NACK, the UE may receive the ACK in a sub-frame n, n+1, or n+2. That is, there is a probability that the discarded HARQ process may correspond to data that was successfully decoded by the NodeB. Therefore, it is desirable to discard a HARQ process that has an increased probability of receiving an ACK (i.e., a HARQ process for data that was successfully decoded and will not trigger a NACK).

According to an aspect of the present disclosure, when the UE receives a grant, if all of the HARQ processes are waiting for a grant to perform a retransmission or waiting for the ACK/NACK, the UE places the HARQ processes in two sets. In one configuration, the UE specifies that the first set includes HARQ processes that are waiting for an ACK/NACK. The HARQ processes in the first set may be waiting for an ACK/NACK in response to a new transmission or a retransmission. As previously discussed, the ACK/NACK is be transmitted on an indication channel, such as the E-HICH. Additionally, in the present configuration, the UE specifies that the second set includes HARQ processes that have received a NACK and are waiting for a grant to perform a retransmission. That is, the second set includes HARQ processes that have already received a NACK.

In some cases, the HARQ process may be waiting to receive the ACK/NACK because the ACK/NACK has yet to be transmitted by the base station or has not yet been received by the UE. In other cases, the feedback channel used to transmit the ACK/NACK may fall in a measurement gap or tune away gap. Therefore, when the feedback channel falls in a measurement gap or tune away gap, the UE (e.g., HARQ process) may not receive the transmitted ACK/NACK.

In one configuration, the UE first discards HARQ processes included in the first set. Furthermore, when the first set is empty and/or when all of the HARQ processes have received a NACK, the UE also discards HARQ process from the second set.

Figure 4:
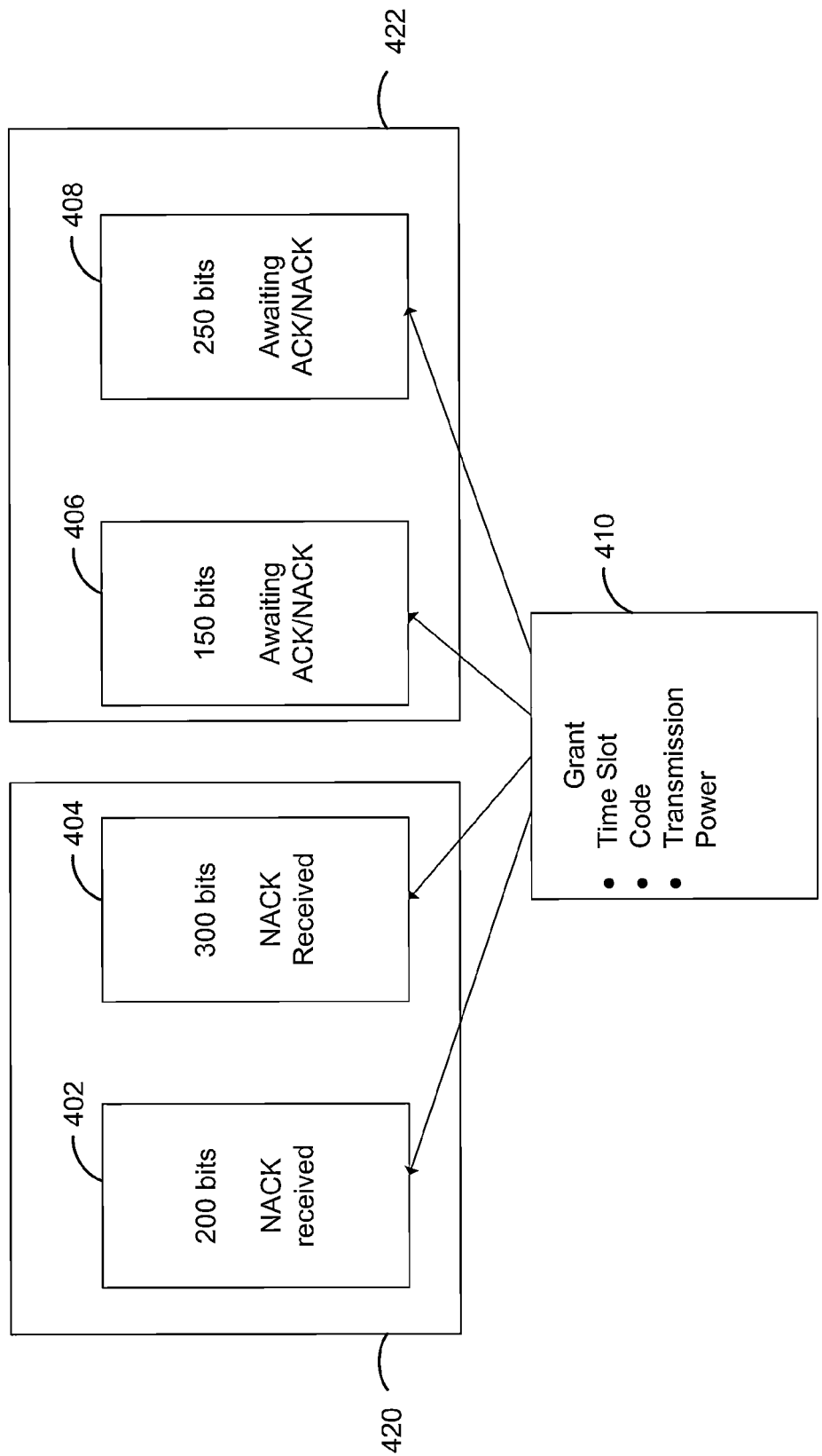
FIG. 4 illustrates an example of grant allocation for HARQ retransmissions.

FIG. 4 illustrates an example of HARQ processes of a UE. Four HARQ processes 402-408 may be specified for a UE. Specifically, the first HARQ process 402 has a transmission block size of 200 bits, the second HARQ process 404 has a transmission block size of 300 bits, the third HARQ process 406 has a transmission block size of 150 bits, and the fourth HARQ process 408 has a transmission block size of 250 bits. The block sizes shown in FIG. 4 are examples of possible block sizes, aspects of the present disclosure are not limited to the block sizes of FIG. 4.

In the present example, some of the HARQ processes 402-404 have received a NACK from a base station in response to data transmission from each HARQ process 402-404. Therefore, some of the HARQ processes 402-404 are waiting for a grant to perform a retransmission. Additionally, in the present example, some of the HARQ processes 406-408 are waiting for an ACK/NACK in response to a new transmission or a retransmission.

Furthermore, in the present example, while the HARQ processes 402-404 are waiting for a grant to perform a retransmission and while the HARQ processes 406-408 are waiting for an ACK/NACK, the UE may receive a grant 410. The grant 410 may include a transmission time slot, a transmission code, and a transmission power. The UE may determine how many bits may be transmitted at the specified time slot based on the transmission power assigned in the grant.

Thus, in the example shown in FIG. 4, a UE receives a grant 410 when the HARQ processes 402-404 are waiting for a grant to perform a retransmission and while the HARQ processes 406-408 are waiting for an ACK/NACK. That is, none of the HARQ processes are for new transmissions. According to the current standards, the UE uses a grant when a grant is received. Thus, in the present example, when the UE receives a grant, the UE determines whether the time slot specified in the grant can support the retransmission of one of the HARQ processes at the transmission power specified in the grant.

In one example, based on the transmission power identified in the grant, the UE may determine that it may only transmit a specific number of bits, such as 40 bits, at the specified time slot. Thus, in the present example, when the HARQ processes 402-408 have a payload that exceeds the number of bits that may be transmitted, the UE discards one of the HARQ processes 402-408 to transmit another HARQ process for new data. As previously discussed, when the grant is insufficient to retransmit the pending HARQ processes and when one or more of the HARQ processes are waiting for a grant to perform a retransmission while one or more of the HARQ processes are waiting for an ACK/NACK, it may be desirable to group the HARQ processes to different sets.

In the present example, a first set 420 may include the first HARQ process 402 and the second HARQ process 404. That is, the first set includes the HARQ processes that are waiting for a grant to perform a retransmission. Furthermore, the second set 422 may include the third HARQ process 406 and the fourth HARQ process 408. That is, the second set includes the HARQ processes that are waiting for an ACK/NACK. In the present configuration, the UE may first discard the HARQ processes from the second set. Furthermore, if the second set is empty (i.e., there are no HARQ processes in the second set), and/or, when all of the HARQ processes have received a NACK, the UE may then discard HARQ processes from the first set.

Figure 5:
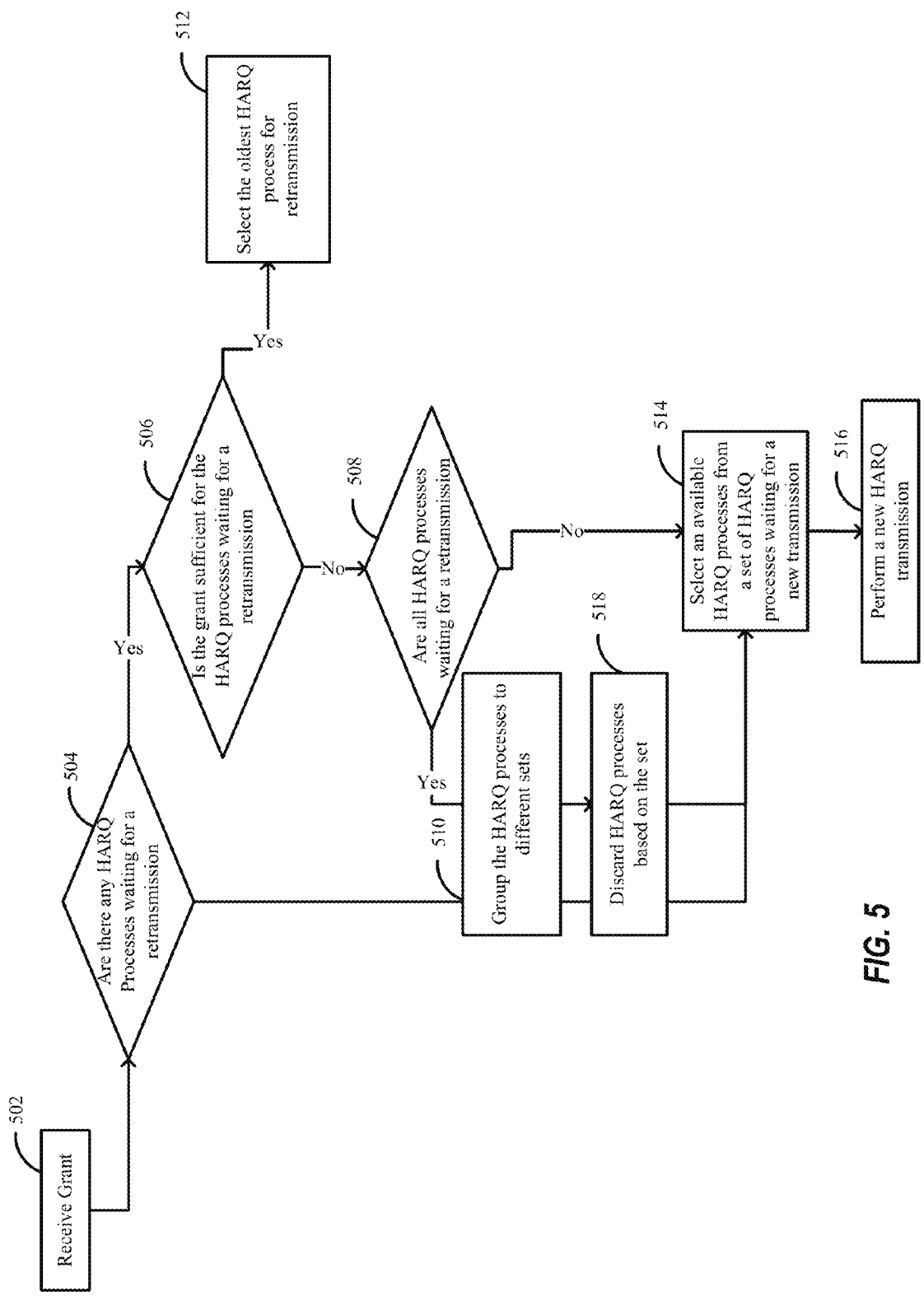
FIGS. 5 and 6 are block diagrams illustrating methods of allocating a grant for HARQ retransmissions according to aspects of the present disclosure.

FIG. 5 illustrates a flow diagram for processing a received grant. At block 502 a UE receives a grant. Furthermore, at block 504, the UE determines whether any of the HARQ processes are waiting to perform a retransmission. If there are no HARQ processes waiting to perform a retransmission, at block 514, the UE selects an available HARQ process from a set of HARQ processes waiting to perform a new transmission and performs a new HARQ transmission at block 516.

Alternatively, if there are one or more HARQ processes waiting to perform a retransmission, at block 506, the UE determines if the grant is sufficient for one or more of the HARQ processes to perform the retransmission. Specifically, the UE determines whether the grant is sufficient by determining whether the resources specified in the grant can support the retransmission of any of the HARQ processes at the transmission power specified in the grant.

In the present configuration, when the grant is sufficient for one of the HARQ processes to perform a retransmission, at block 512, the UE selects the oldest HARQ process(es) supported by the grant and performs a retransmission of the selected HARQ process(es). Alternatively, when the grant is not sufficient for one of the HARQ processes to perform a retransmission, at block 508, the UE determines whether all of the HARQ processes are waiting to perform a retransmission. In the present configuration, HARQ processes that are waiting to perform a retransmission refers to HARQ processes that have received a NACK and/or HARQ processes that have yet to receive an ACK or a NACK.

In the present configuration, when one or more HARQ processes are not waiting to perform a retransmission, at block 514, the UE selects an available HARQ process from a set of HARQ processes waiting to perform a new transmission and performs a new HARQ transmission at block 516. Alternatively, when all of the HARQ processes are waiting for a grant to perform a retransmission, at block 510, the UE groups the HARQ processes to different sets.

That is, the UE groups the HARQ processes to a first set and a second set. Of course, aspects of the present disclosure are not limited to two sets and more sets are also contemplated. In the present configuration, the first set includes the HARQ processes that are waiting for a grant to perform a retransmission. Furthermore, the second set includes the HARQ processes that are waiting for an ACK/NACK. In the present configuration, at block 518, the UE may first discard the HARQ processes from the second set. Furthermore, if the second set is empty (i.e., there are no HARQ processes in the second set), and/or, when all of the HARQ processes have received a NACK, the UE may then discard HARQ processes from the first set. When one or more of the HARQ processes have been discarded, at block 514, the UE selects an available HARQ process from a set of HARQ processes waiting to perform a new transmission and performs a new HARQ transmission at block 516.

Figure 6:
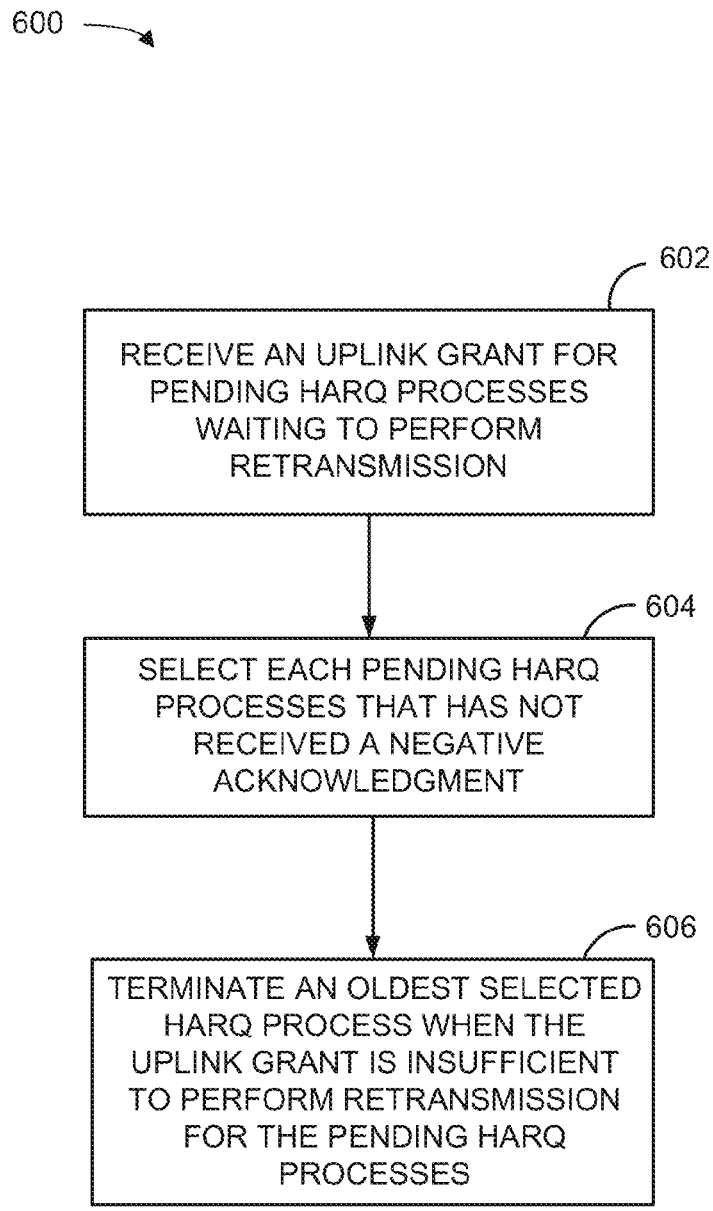

FIG. 6 shows a wireless communication method 600 according to one aspect of the disclosure. A UE receives an uplink grant for pending HARQ processes waiting to perform retransmission as shown in block 602. The UE also selects each pending HARQ process that has not received a NACK as shown in block 604. Furthermore, as shown in block 606, the UE terminates an oldest selected HARQ process when the uplink grant is insufficient to perform retransmission for the pending HARQ processes.

Figure 7:
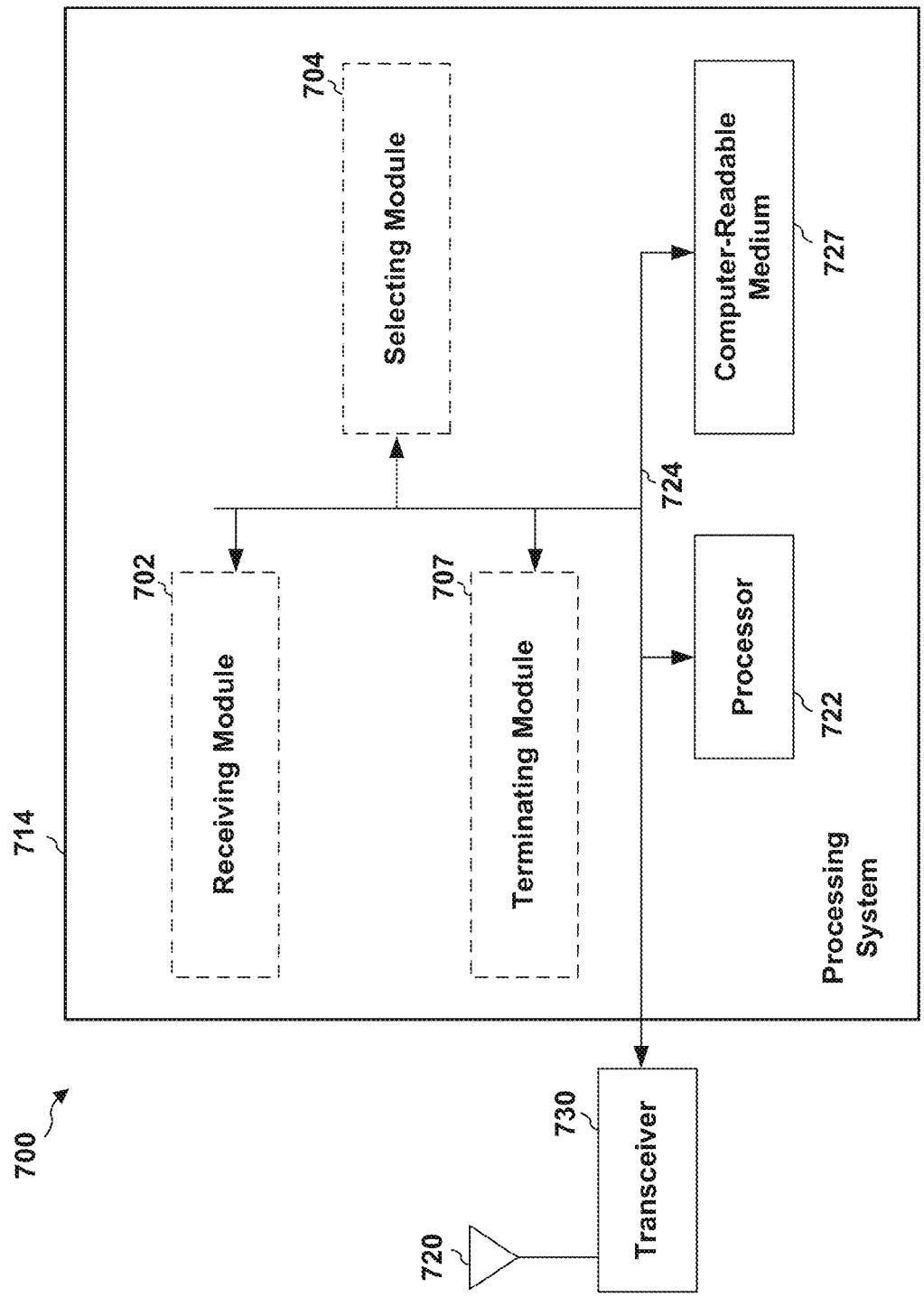
FIG. 7 is a diagram illustrating an example of a hardware implementation for an apparatus employing a processing system according to one aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 the modules 702, 704, 707 and the non-transitory computer-readable medium 727. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other apparatus over a transmission medium. The processing system 714 includes a processor 722 coupled to a non-transitory computer-readable medium 727. The processor 722 is responsible for general processing, including the execution of software stored on the non-transitory computer-readable medium 727. The software, when executed by the processor 722, causes the processing system 714 to perform the various functions described for any particular apparatus. The non-transitory computer-readable medium 727 may also be used for storing data that is manipulated by the processor 722 when executing software.

The processing system 714 includes a receiving module 702 for receiving an uplink grant for pending HARQ processes. In some cases, the uplink grant may be insufficient for performing a retransmission of the pending HARQ processes. In one configuration, the processing system 714 may include a determining module (not shown) to determine whether the uplink grant is sufficient. The processing system 714 also includes a selecting module 704 for selecting each pending HARQ process that has not received a NACK. Moreover, the processing system 714 further includes a terminating module 707 for terminating an oldest selected HARQ process when the uplink grant is insufficient to perform retransmission for the pending HARQ processes. The modules may be software modules running in the processor 722, resident/stored in the non-transitory computer-readable medium 727, one or more hardware modules coupled to the processor 722, or some combination thereof. The processing system 714 may be a component of the UE 350 and may include the memory 392, and/or the controller/processor 390.

In one configuration, an apparatus such as a UE is configured for wireless communication including means for receiving. In one aspect, the receiving means may be the antennas 352, the receiver 354, the channel processor 394, the receive frame processor 360, the receive processor 370, the controller/processor 390, the memory 392, the HARQ terminating module 391, receiving module 702, and/or the processing system 714 configured to perform the determining means. The UE is also configured to include means for selecting and means for terminating. In one aspect, the selecting means and/or the terminating means may be the channel processor 394, the transmit frame processor 382, the transmit processor 380, the controller/processor 390, the memory 392, the HARQ terminating module 391, selecting module 704, the terminating module 707, and/or the processing system 714 configured to perform the retransmitting means. In one aspect the means functions recited by the aforementioned means. In another aspect, the aforementioned means may be a module or any apparatus configured to perform the functions recited by the aforementioned means.

Several aspects of a telecommunications system has been presented with reference to TD-SCDMA and HSUPA systems. As those skilled in the art will readily appreciate, various aspects described throughout this disclosure may be extended to other telecommunication systems, network architectures and communication standards where a grant does not specify a HARQ process ID. By way of example, various aspects may be extended to other UMTS systems such as W-CDMA, high speed downlink packet access (HS-DPA), high speed packet access plus (HSPA+) and TD-CDMA. Various aspects may also be extended to systems employing long term evolution (LTE) (in FDD, TDD, or both modes), LTE-Advanced (LTE-A) (in FDD, TDD, or both modes), CDMA2000, evolution-data optimized (EV-DO), ultra mobile broadband (UMB), IEEE 802.11 (Wi-Fi), IEEE 802.17 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving an uplink grant for a plurality of pending hybrid automatic repeat request (HARQ) processes waiting to perform a retransmission;
   selecting each pending HARQ process that has not received a negative acknowledgment (NACK); and
   terminating an oldest selected HARQ process when an uplink transmission power identified in the uplink grant is insufficient to perform the retransmission for the plurality of pending HARQ processes.

2. The method of claim 1, further comprising discarding an oldest HARQ process that has received the NACK when all HARQ processes have received the NACK.

3. The method of claim 1, in which a UE has not received the NACK because an acknowledgement (ACK)/NACK message is transmitted on a feedback channel that is received in a measurement gap or tune away gap.

4. The method of claim 1, in which a UE has not received the NACK because the NACK has not yet arrived.

5. The method of claim 1, further comprising determining whether the uplink grant is insufficient to perform the retransmission for the plurality of pending HARQ processes.

6. An apparatus for wireless communication, the apparatus comprising:
  a memory unit; and
  at least one processor coupled to the memory unit; the at least one processor being configured:
    to receive an uplink grant for a plurality of pending hybrid automatic repeat request (HARQ) processes waiting to perform a retransmission;
    to select each pending HARQ process that has not received a negative acknowledgment (NACK); and
    to terminate an oldest selected HARQ process when an uplink transmission power identified in the uplink grant is insufficient to perform the retransmission for the plurality of pending HARQ processes.

7. The apparatus of claim 6, in which the at least one processor is further configured to discard an oldest HARQ process that has received the NACK when all HARQ processes have received the NACK.

8. The apparatus of claim 6, in which a UE has not received the NACK because an acknowledgement (ACK)/NACK message is transmitted on a feedback channel that is received in a measurement gap or tune away gap.

9. The apparatus of claim 6, in which a UE has not received the NACK because the NACK has not yet arrived.

10. The apparatus of claim 6, in which the at least one processor is further configured to determine whether the uplink grant is insufficient to perform the retransmission for the plurality of pending HARQ processes.

11. An apparatus for wireless communication, the apparatus comprising:
  means for receiving an uplink grant for a plurality of pending hybrid automatic repeat request (HARQ) processes waiting to perform a retransmission;
  means for selecting each pending HARQ process that has not received a negative acknowledgment (NACK); and
  means for terminating an oldest selected HARQ process when an uplink transmission power identified in the uplink grant is insufficient to perform the retransmission for the plurality of pending HARQ processes.

12. The apparatus of claim 11, further comprising means for discarding an oldest HARQ process that has received the NACK when all HARQ processes have received the NACK.

13. The apparatus of claim 11, in which a UE has not received the NACK because an acknowledgement (ACK)/NACK message is transmitted on a feedback channel that is received in a measurement gap or tune away gap.

14. The apparatus of claim 11, in which a UE has not received the NACK because the NACK has not yet arrived.

15. The apparatus of claim 11, further comprising means for determining whether the uplink grant is insufficient to perform the retransmission for the plurality of pending HARQ processes.

16. A non-transitory computer-readable medium having program code recorded thereon, the program code comprising:
  program code to receive an uplink grant for a plurality of pending hybrid automatic repeat request (HARQ) processes waiting to perform a retransmission;
  program code to select each pending HARQ process that has not received a negative acknowledgment (NACK); and
  program code to terminate an oldest selected HARQ process when an uplink transmission power identified in the uplink grant is insufficient to perform the retransmission for the plurality of pending HARQ processes.

17. The computer-readable medium of claim 16, in which the program code further comprises program code to discard an oldest HARQ process that has received the NACK when all HARQ processes have received the NACK.

18. The computer-readable medium t of claim 16, in which a UE has not received the NACK because an acknowledgement (ACK)/NACK message is transmitted on a feedback channel that is received in a measurement gap or tune away gap.

19. The computer-readable medium of claim 16, in which a UE has not received the NACK because the NACK has not yet arrived.

20. The computer-readable medium of claim 16, in which the program code further comprises program code to determine whether the uplink grant is insufficient to perform the retransmission for the plurality of pending HARQ processes.

* * * * *